(12) United States Patent
Rigg et al.

(10) Patent No.: US 11,519,293 B2
(45) Date of Patent: Dec. 6, 2022

(54) CLEANING SYSTEM AND A METHOD OF CLEANING

(71) Applicant: ROLLS-ROYCE plc, London (GB)

(72) Inventors: Graeme E. Rigg, Derby (GB);
Timothy P. Aggas, Coalville (GB);
David Munton, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/034,683

(22) Filed: Sep. 28, 2020

(65) Prior Publication Data
US 2021/0108537 A1   Apr. 15, 2021

(30) Foreign Application Priority Data

Oct. 11, 2019 (GB) ..................................... 1914723

(51) Int. Cl.
*F01D 25/00* (2006.01)
(52) U.S. Cl.
CPC ...... *F01D 25/002* (2013.01); *F05D 2220/323* (2013.01)
(58) Field of Classification Search
CPC .......................... F01D 25/002; F01D 2220/323
See application file for complete search history.

(56) References Cited

U.S. PATENT DOCUMENTS

| | | | |
|---|---|---|---|
| 3,033,493 A | 5/1962 | Wilde et al. | |
| 3,042,553 A | 7/1962 | Kearney et al. | |
| 3,212,762 A | 10/1965 | Carroll et al. | |
| 3,544,042 A | 12/1970 | Jean et al. | |
| 5,425,183 A | 6/1995 | Taylor | |
| 5,655,732 A | 8/1997 | Frank | |
| 5,899,217 A | 5/1999 | Testman | |

(Continued)

FOREIGN PATENT DOCUMENTS

CA         2506113 A1 *  8/2005
DE   102008047493 B4     9/2016
(Continued)

OTHER PUBLICATIONS

Great Britain search report dated Mar. 3, 2020, issued in GB Patent Application No. 1914723.0.
(Continued)

*Primary Examiner* — Sharidan Carrillo
(74) *Attorney, Agent, or Firm* — Barnes & Thornburg LLP

(57) ABSTRACT

A cleaning system for cleaning gas paths in an engine core of a gas turbine engine is provided. The cleaning system includes a source of an engine cleaning liquid; an engine cleaning mist forming unit that vapourises the engine cleaning liquid to form an engine cleaning mist and delivers the engine cleaning mist into the engine core of the gas turbine engine; at least one delivery device configured to deliver the engine cleaning liquid to the engine cleaning mist forming unit; a pump configured to draw the engine cleaning mist through the engine core to clean the gas paths within the engine core; and a mist collecting arrangement including a condensing chamber. The mist collecting arrangement is configured to collect the engine cleaning mist that has passed through the engine core and condense the collected engine cleaning mist in the condensing chamber.

10 Claims, 6 Drawing Sheets

(56) References Cited

U.S. PATENT DOCUMENTS

| | | | |
|---|---|---|---|
| 6,027,572 A | 2/2000 | Labib et al. | |
| 6,394,108 B1* | 5/2002 | Butler | B08B 3/026 |
| | | | 415/117 |
| 6,478,033 B1 | 11/2002 | Foster | |
| 7,122,065 B2 | 10/2006 | Fox | |
| 7,297,260 B2 | 11/2007 | Hjerpe et al. | |
| 7,703,272 B2 | 4/2010 | Wagner et al. | |
| 7,849,878 B2 | 12/2010 | Kohler et al. | |
| 7,946,525 B2 | 5/2011 | Groening | |
| 8,109,807 B2 | 2/2012 | Giljohann et al. | |
| 8,246,753 B2 | 8/2012 | Tadayon | |
| 8,444,773 B2 | 5/2013 | Tadayon | |
| 8,523,189 B2 | 9/2013 | Harper | |
| 8,572,785 B2 | 11/2013 | Christan | |
| 8,628,627 B2 | 1/2014 | Sales et al. | |
| 9,138,788 B2 | 9/2015 | Amcoff et al. | |
| 9,212,565 B2 | 12/2015 | Dorshimer et al. | |
| 9,269,284 B1 | 2/2016 | Biehl et al. | |
| 9,511,865 B2 | 12/2016 | Thomaschewski | |
| 9,631,511 B2 | 4/2017 | Rice et al. | |
| 9,657,590 B2 | 5/2017 | Griffiths et al. | |
| 9,744,746 B2 | 8/2017 | Reifferscheid | |
| 9,790,808 B2 | 10/2017 | Rice et al. | |
| 9,821,349 B2 | 11/2017 | Griffiths et al. | |
| 9,835,048 B2 | 12/2017 | Griffiths et al. | |
| 9,874,108 B2 | 1/2018 | Griffiths et al. | |
| 9,926,517 B2 | 3/2018 | Tibbetts et al. | |
| 10,018,113 B2 | 7/2018 | Bewlay et al. | |
| 10,041,372 B2 | 8/2018 | Hjerpe et al. | |
| 10,047,698 B2 | 8/2018 | Hicklin et al. | |
| 10,144,516 B2 | 12/2018 | Thomaschewski | |
| 10,364,699 B2 | 7/2019 | Saenz et al. | |
| 2002/0088480 A1* | 7/2002 | Woodmansee | B08B 9/00 |
| | | | 134/22.13 |
| 2002/0129837 A1* | 9/2002 | Ruiz | F01D 25/002 |
| | | | 134/18 |
| 2006/0219269 A1 | 10/2006 | Rice et al. | |
| 2007/0149385 A1 | 6/2007 | Liu et al. | |
| 2008/0149141 A1* | 6/2008 | Sales | B08B 3/026 |
| | | | 134/22.1 |
| 2008/0250769 A1 | 10/2008 | Wagner et al. | |
| 2009/0050183 A1* | 2/2009 | Rice | B08B 3/14 |
| | | | 134/107 |
| 2009/0162139 A1 | 6/2009 | Miller et al. | |
| 2011/0232697 A1 | 9/2011 | Amcoff et al. | |
| 2013/0087175 A1 | 4/2013 | Petter et al. | |
| 2014/0000656 A1 | 1/2014 | Rice et al. | |
| 2014/0260308 A1 | 9/2014 | Dorshimer et al. | |
| 2015/0122292 A1* | 5/2015 | McDermott | F01D 25/002 |
| | | | 134/18 |
| 2015/0210210 A1 | 7/2015 | Wolf et al. | |
| 2016/0186602 A1 | 6/2016 | Saenz | |
| 2016/0230592 A1 | 8/2016 | Saenz et al. | |
| 2017/0167290 A1 | 6/2017 | Kulkarni et al. | |
| 2017/0239692 A1 | 8/2017 | Diwinsky | |
| 2018/0043400 A1* | 2/2018 | Griffiths | B08B 3/003 |
| 2018/0149038 A1 | 5/2018 | Eriksen et al. | |
| 2018/0155060 A1 | 6/2018 | Dauenhauer et al. | |
| 2018/0245477 A1 | 8/2018 | Kulkarni et al. | |
| 2018/0283209 A1 | 10/2018 | Eriksen et al. | |

FOREIGN PATENT DOCUMENTS

| | | |
|---|---|---|
| DE | 102013205664 B4 | 11/2017 |
| EP | 1860084 B1 | 8/2012 |
| EP | 2630039 B1 | 12/2014 |
| EP | 2871133 A1 | 5/2015 |
| EP | 2966265 A1 | 1/2016 |
| EP | 3213827 A1 | 9/2017 |
| EP | 2855267 B1 | 10/2018 |
| EP | 2904130 B1 | 5/2019 |
| EP | 2855270 B1 | 2/2020 |
| FR | 3063230 A1 | 8/2018 |
| GB | 955291 A | 4/1964 |
| GB | 2536764 B | 5/2017 |
| JP | 2009044015 A | 2/2009 |
| KR | 101731372 B1 | 5/2017 |
| WO | 02072287 A1 | 9/2002 |
| WO | 2005077554 A1 | 8/2005 |
| WO | 2005120953 A1 | 12/2005 |
| WO | 2007102738 A1 | 9/2007 |
| WO | 2007147191 A1 | 12/2007 |
| WO | 2014131671 A1 | 9/2014 |
| WO | 2015051146 A1 | 4/2015 |
| WO | 2016046000 A1 | 3/2016 |
| WO | 2017129443 A1 | 8/2017 |
| WO | 2018015247 A1 | 1/2018 |
| WO | 2018077823 A1 | 5/2018 |

OTHER PUBLICATIONS

European search report dated Nov. 13, 2020, issued in EP Patent Application No. 20195734.7.

* cited by examiner

CLEANING SYSTEM AND A METHOD OF CLEANING

CROSS-REFERENCE TO RELATED APPLICATIONS

This specification is based upon and claims the benefit of priority from UK Patent Application Number 1914723.0 filed on 11 Oct. 2019, which is hereby incorporated herein in its entirety.

BACKGROUND

Technical Field

The present disclosure relates to a cleaning system for cleaning an engine core of a gas turbine engine and a method of cleaning an engine core of a gas turbine engine.

Description of the Related Art

Gas turbine engines, especially those powering an aircraft, ingest debris such as sand, dust, soot and carbon during use. The accumulation of this debris can detrimentally affect engine performance and efficiency and may cause wear, thus necessitating periodic cleaning and maintenance. Cleaning a gas turbine engine, especially air passages within an engine core of the gas turbine engine, can be a difficult operation. For gas turbine engines powering the aircraft, the cleaning can require temporarily removing the gas turbine engine from a wing of the aircraft. This is a time consuming and costly operation, requiring specialised equipment and specialist technicians and can present certain health and safety risks. During the operation, which typically involves cleaning two or four engines, the engines and the aircraft are not available for use, which is very costly for the airline that owns or leases the aircraft.

Certain methods for cleaning gas turbine engines without removing the gas turbine engines from the aircraft are known. Such methods typically involve operating a starter motor of the aircraft to generate a flow of a cleaning agent. The operation of the starter motor may require specialist technicians. Further, the starter motor can only be used for limited periods and require cooling before next use. Also, such methods can lead to contamination of a cabin bleed. Conventional methods also require large volumes of liquid that may be difficult to deliver, collect, remove and dispose.

SUMMARY

The present disclosure provides a cleaning system for cleaning gas paths in an engine core of a gas turbine engine, a method of cleaning gas paths in an engine core of a gas turbine engine, and a gas turbine engine comprising an engine core that has been cleaned using that method, as set out in the appended claims.

According to a first aspect there is provided a cleaning system for cleaning gas paths in an engine core of a gas turbine engine. The cleaning system includes a source of an engine cleaning liquid; an engine cleaning mist forming unit that vapourises the engine cleaning liquid to form an engine cleaning mist and delivers the engine cleaning mist into the engine core of the gas turbine engine; at least one delivery device configured to deliver the engine cleaning liquid to the engine cleaning mist forming unit; a pump configured to draw the engine cleaning mist through the engine core to clean the gas paths within the engine core; and a mist collecting arrangement including a condensing chamber. The mist collecting arrangement is configured to collect the engine cleaning mist that has passed through the engine core and condense the collected engine cleaning mist in the condensing chamber.

In an arrangement, the at least one delivery device is configured to be placed in from of the engine core.

In an arrangement, the at least one delivery device is configured to be inserted from a rear of the gas turbine engine through a bypass duct of the gas turbine engine.

In an arrangement, the at least one delivery device is configured to be inserted from a front of the gas turbine engine.

In an arrangement, the pump is at least one of a vacuum pump and a fan.

In an arrangement, the condensing chamber is a closed chamber. In an alternative arrangement, the condensing chamber is open to atmosphere.

In an arrangement, the mist collecting arrangement further includes a tooling configured to interface with a rear of the engine core; and a conduit connected to the tooling and configured to deliver the collected engine cleaning mist to the condensing chamber.

In an arrangement, the conduit is a flexible duct.

In an arrangement, the pump is disposed in the conduit.

According to a second aspect, there is provided a method of cleaning gas paths in an engine core of a gas turbine engine. The method includes vapourising an engine cleaning liquid to form an engine cleaning mist; supplying the engine cleaning mist into the engine core of the gas turbine engine; drawing the engine mist through the engine core to clean the gas paths within the engine core; and collecting the engine cleaning mist that has passed through the engine core and condensing the collected engine cleaning mist.

In an arrangement, the method further includes supplying the engine cleaning liquid to an engine cleaning mist forming unit. The engine cleaning mist forming unit vapourises the engine cleaning liquid to form the engine cleaning mist and supplies the engine cleaning mist into the engine core of the gas turbine engine.

In an arrangement, the method further includes placing a delivery device in front of the engine core. The delivery device is configured to supply the engine cleaning liquid to the engine cleaning mist forming unit.

In an arrangement, placing the delivery device further includes inserting the delivery device from a rear of the gas turbine engine through a bypass duct of the gas turbine engine.

In an arrangement, placing the delivery device further includes inserting the delivery device from a front of the gas turbine engine.

In an arrangement, the method further includes interfacing a tooling with a rear of the engine core.

According to a third aspect, there is provided a gas turbine engine including an engine core that has been cleaned using the method of the third aspect.

The cleaning system and the method of the present disclosure may draw a low particulate size mist through an engine core by means of a pump. This may negate the need to run a starter motor, thereby slowing the flowrate to provide greater blade surface to detergent soak time and improved blade cleaning. Further, consumption of water and detergent may be significantly reduced. Any environmental impact associated with cleaning may also be reduced. In an arrangement, a biodegradable detergent may be used to create a biodegradable mist.

In an arrangement, the pump may be used in conjunction with a tooling sealed to the rear of the engine core. The pump and the tooling sealed to the rear of the engine core may also improve collection efficiency by collecting the effluent in a condensing chamber. There may be reduced contamination and less liquid left in the engine core. Drainage requirement of engine pipework may be reduced. Since compression in the engine is not used to generate flow of the cleaning mist, i.e. the cleaning system does not require the compressor of the engine to rotate during cleaning, maintenance associated with contamination of a cabin bleed may be significantly reduced. This is beneficial as when using conventional engine cleaning methods, wash fluid can be pushed into cabin bleed and other engine systems, causing additional maintenance and sometimes leaving an unpleasant aroma within the cabin of the aircraft.

The cleaning system and the method of the present disclosure may not require a specialist technician to operate the gas turbine engine. Since the starter motor is not used, cleaning of the gas turbine engine is not impacted by a cool down period of the starter motor. This may lower operational costs and reduce process time. There may be fewer health and safety risks as the gas turbine engine is not operational during cleaning. Cleaning can occur in situ while the gas turbine engine is mounted on the aircraft. Alternative the engine may be cleaned in a test cell or cleaned off-wing. Cleaning may also be more robust to weather conditions.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
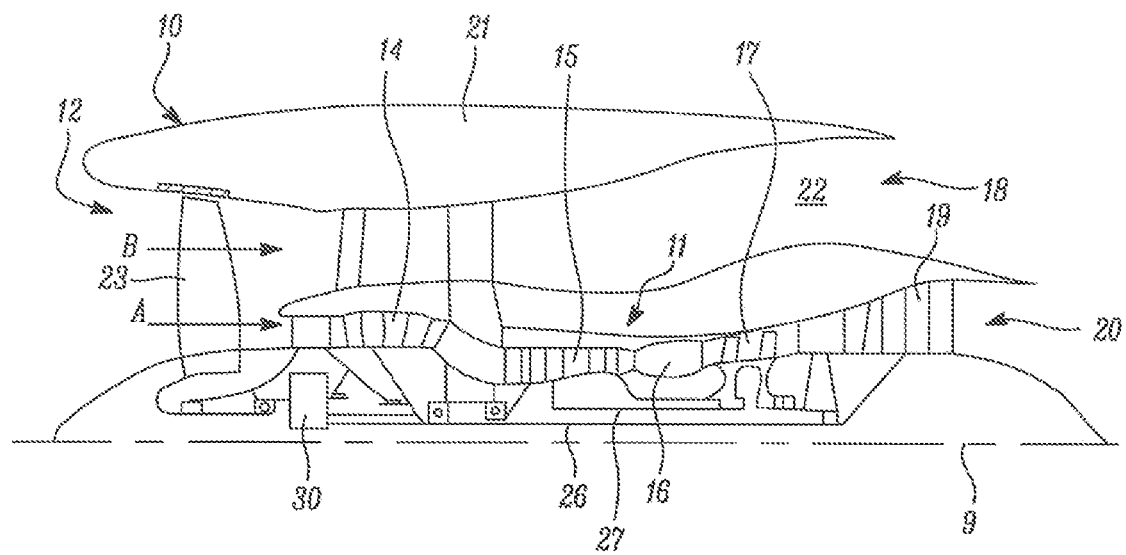
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
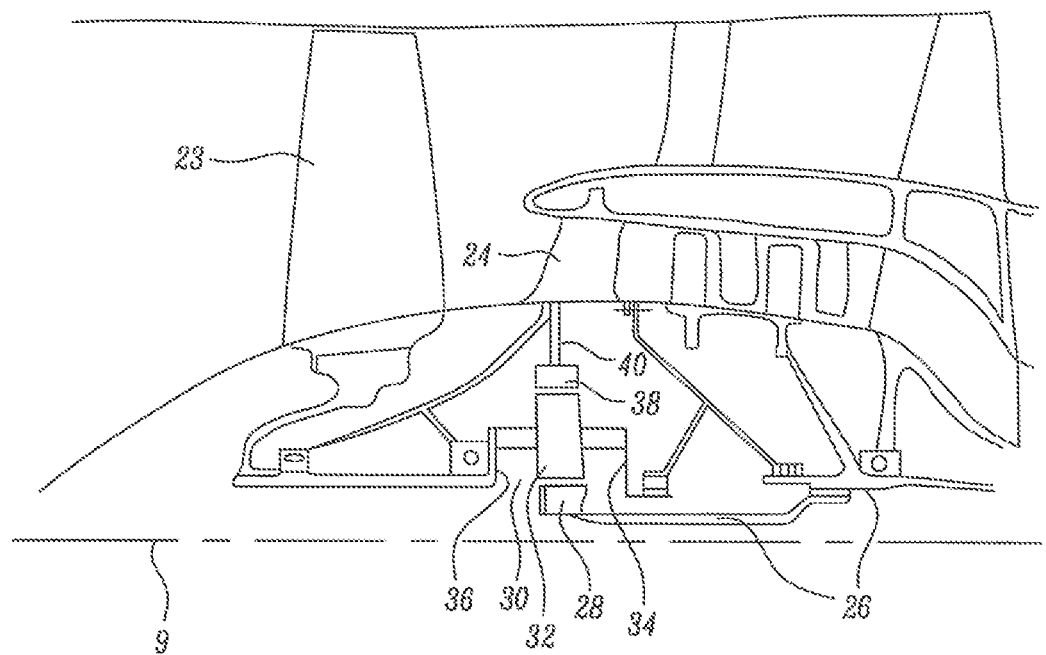
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
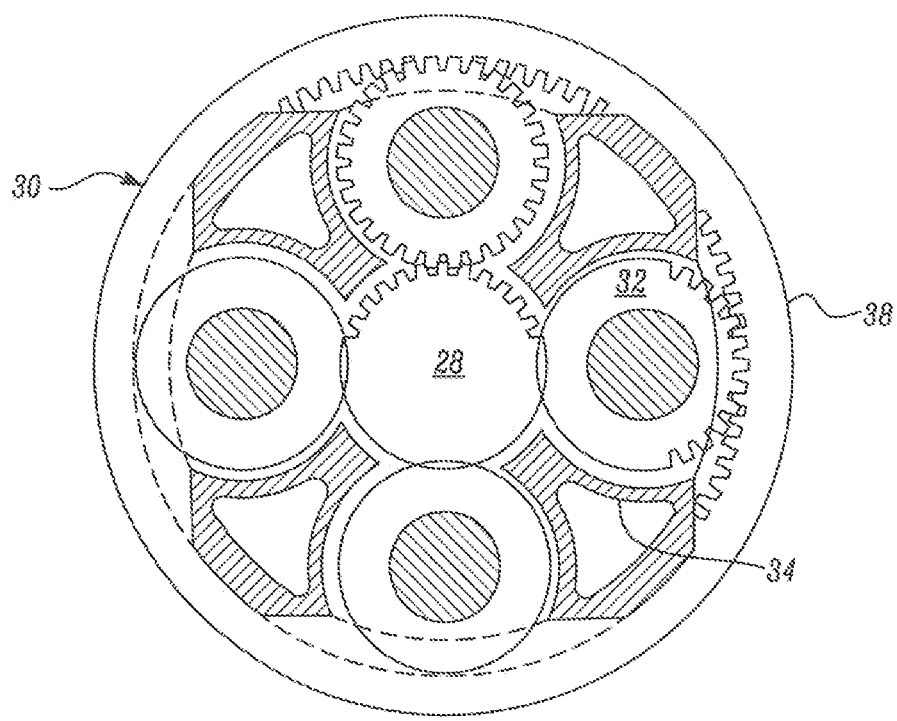
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
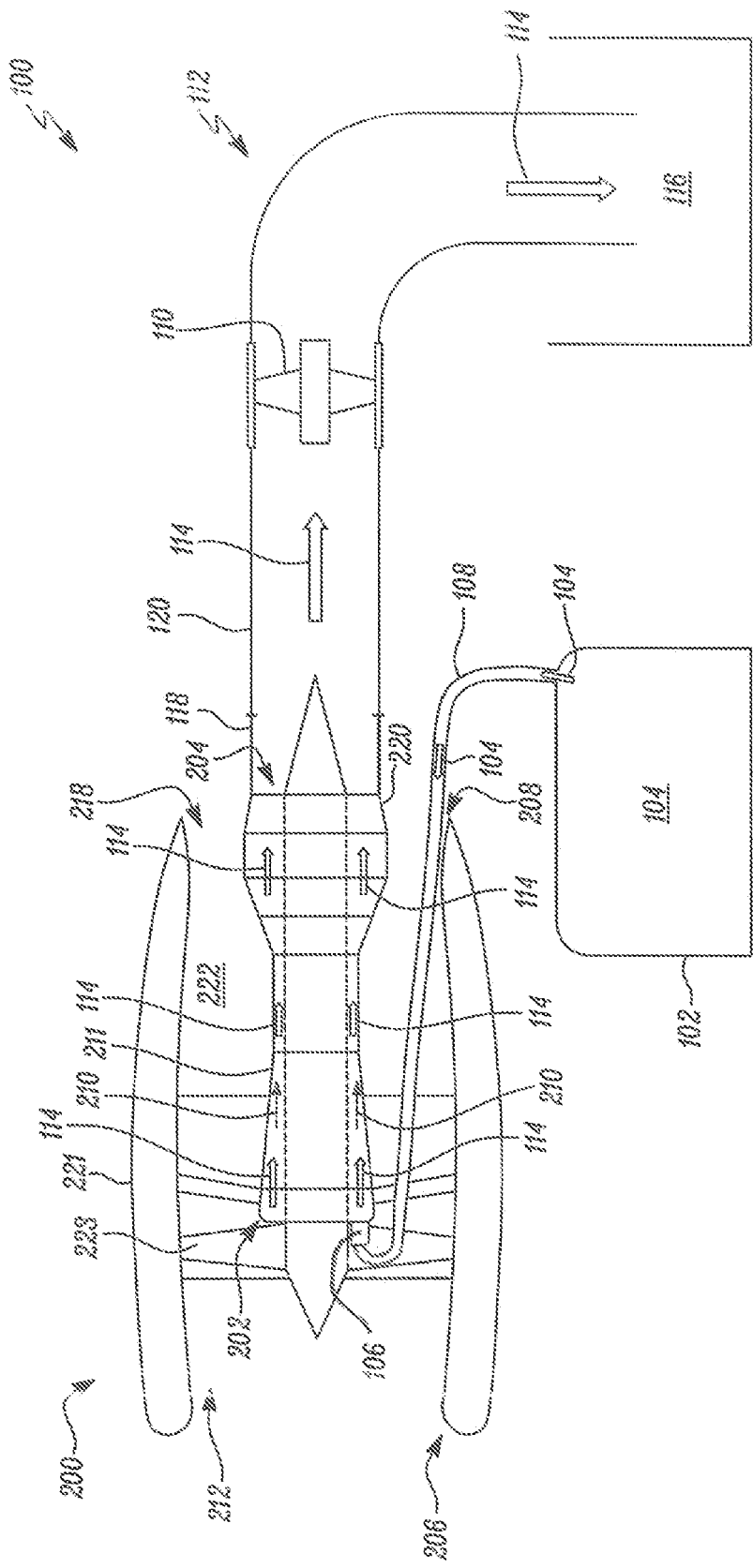
FIG. 4 schematically depicts a cleaning system for cleaning a gas turbine engine.

FIG. 4 shows a cleaning system 100 that may be used for cleaning gas paths in an engine core of a gas turbine engine, such as those described above. The cleaning system 100 includes a source 102 of an engine cleaning liquid 104, an engine cleaning mist forming unit 106, at least one delivery device 108, a pump 110, and a mist collecting arrangement 112.

The source 102 may include one or more tanks or vessels that can store the engine cleaning liquid 104. The engine cleaning liquid 104 may be a mixture of water and a detergent. In some cases, the detergent may be biodegradable. In an arrangement, the source 102 may include components to generate the engine cleaning liquid 104, such as a water tank, a detergent tank and a mixer for mixing detergent and water in order to generate the engine cleaning liquid 104. In some embodiments, the source 102 may optionally store an anti-freeze. The source 102 may include an anti-freeze tank for storing the antifreeze. The anti-freeze may be mixed with the engine cleaning liquid 104. The source 102 may include additional components, such as one or more valves, pipes, seals, filters, fluid connectors, fluid pump etc.

In some embodiments, the source 102 may pressurise the engine cleaning liquid 104. For example, the fluid pump of the source 102 may pressurise the engine cleaning liquid 104 to supply the engine cleaning liquid 104 in pressurised state. In some embodiments, the source 102 may optionally include a heating element to heat the engine cleaning liquid 104. Further, a composition of the engine cleaning liquid 104 may be changed based on a specific stage during cleaning. For example, the source 102 may supply water without any detergent for rinsing. In such cases, the engine cleaning liquid 104 may be substantially free of any detergent.

The engine cleaning mist forming unit 106 (hereinafter referred to as "the mist forming unit 106") vapourises the engine cleaning liquid 104 to form an engine cleaning mist 114. The mist forming unit 106 is in fluid communication with the source 102 for receiving the engine cleaning liquid 104. The engine cleaning mist 114 may include droplets of the engine cleaning liquid 104 suspended in a gas, such as air. The engine cleaning mist 114 and the gas may form an aerosol.

The terms "vapourise" and "vapourising", as used herein, refers to the formation of a mist that includes droplets of a liquid suspended in a gas.

The mist forming unit 106 may use different mechanisms to vapourise the engine cleaning liquid 104 to form the engine cleaning mist 114. The mist forming unit 106 further delivers the engine cleaning mist 114 into the engine core of the gas turbine engine.

The at least one delivery device 108 is configured to deliver the engine cleaning liquid 104 to the mist forming unit 106. In the illustrated embodiment of FIG. 4, the cleaning system 100 includes one delivery device 108. However, the cleaning system 100 may include two or more delivery devices 108 based on application requirements.

The pump 110 is configured to draw the engine cleaning mist through the engine core to clean the gas paths within the engine core. The pump may also be used without the cleaning mist to cool the engine prior to cleaning and/or to dry the engine after cleaning.

The mist collecting arrangement 112 includes a condensing chamber 116. The mist collecting arrangement 112 is configured to collect the engine cleaning mist 114 that has passed through the engine core and condense the collected engine cleaning mist 114 in the condensing chamber 116.

As shown in FIG. 4, the cleaning system 100 is used for cleaning a gas turbine engine 200. The gas turbine engine 200 is substantially similar to the gas turbine engine 10 described above. The gas turbine engine 200 includes an air intake 212 and a propulsive fan 223. The gas turbine engine 200 includes an engine core 211. Various components of the engine core 211 are not shown in FIG. 4 for the purpose of clarity. The engine core 211 includes, in axial flow series, a low pressure compressor, a high pressure compressor, combustion equipment, a high pressure turbine, a low pressure turbine and a core exhaust nozzle 220. A nacelle 221 surrounds the gas turbine engine 200 and defines a bypass duct 222 and a bypass exhaust nozzle 218. The nacelle 221 may be supported on a body of an aircraft by one or more pylons. In an arrangement, the nacelle 221 may be mounted on a wing of the aircraft by the one or more pylons. The engine core 211 includes a front end 202 and a rear end 204. The front end 202 may be proximal to the low pressure compressor, while the rear end 204 may be proximal to the core exhaust nozzle 220. The gas turbine engine 200 also includes a front end 206 and a rear end 208. The front end 206 is proximal to the air intake 212, while the rear end 208 is proximal to the bypass exhaust nozzle 218. The propulsive fan 223 generates a core airflow and a bypass airflow.

In use, the core airflow is accelerated and compressed by the low pressure compressor and directed into the high pressure compressor where further compression takes place. The compressed air exhausted from the high pressure compressor is directed into the combustion equipment where it is mixed with fuel and the mixture is combusted. The resultant hot combustion products then expand through, and thereby drive, the high pressure and low pressure turbines before being exhausted through the core exhaust nozzle 220 to provide some propulsive thrust. The core airflow, the compressed air, and the hot combustion products may flow through gas paths 210 in the engine core 211. The bypass airflow flows through the bypass duct 222.

The cleaning system 100 is used for cleaning the gas paths 210 in the engine core 211 of the gas turbine engine 200. As shown in FIG. 4, the at least one delivery device 108 is configured to be placed in front of the engine core 211. Specifically, the delivery device 108 is placed near the front end 202 of the engine core 211. Further, the at least one delivery device 108 is configured to be inserted from a rear of the gas turbine engine 200 through the bypass duct 222 of the gas turbine engine 200. As shown in FIG. 4, the delivery device 108 is inserted from the rear end 208 of the gas turbine engine 200 through the bypass duct 222. The delivery device 108 is then inserted into the engine core 211. In an arrangement, an additional delivery device (not shown in FIG. 4) may be inserted from a front of the gas turbine engine 200.

The delivery device 108 can include one or more conduits configured to receive a flow of the engine cleaning liquid 104 from the source 102 and deliver the flow of the engine cleaning liquid 104 to the mist forming unit 106. In some cases, the delivery device 108 may receive the engine cleaning liquid 104 in pressurised state. The delivery device 108 delivers the pressurised engine cleaning liquid 104 to the mist forming unit 106. An end of the delivery device 108 is in fluid communication with the source 102 and receives the engine cleaning liquid 104. An opposite end of the delivery device 108 delivers the engine cleaning liquid 104 to the mist forming unit 106. The delivery device 108 may include a flexible conduit (e.g., a hose), a rigid conduit (e.g., a pipe), or a combination thereof. The one or more conduits of the delivery device 108 may be made of a fluid impermeable material to substantially prevent any leakage of the engine cleaning liquid 104. The delivery device 108 may further include various components, such as fluid connectors, pipe fittings, adapters etc. The delivery device 108 may include one or more bends in order to deliver the engine cleaning liquid 104 to the mist forming unit 106. In an arrangement, the delivery device 108 may be specific to an engine geometry. The engine geometry may correspond to a single type (e.g., model) of gas turbine engines or a family of gas turbine engines.

Figure 5:
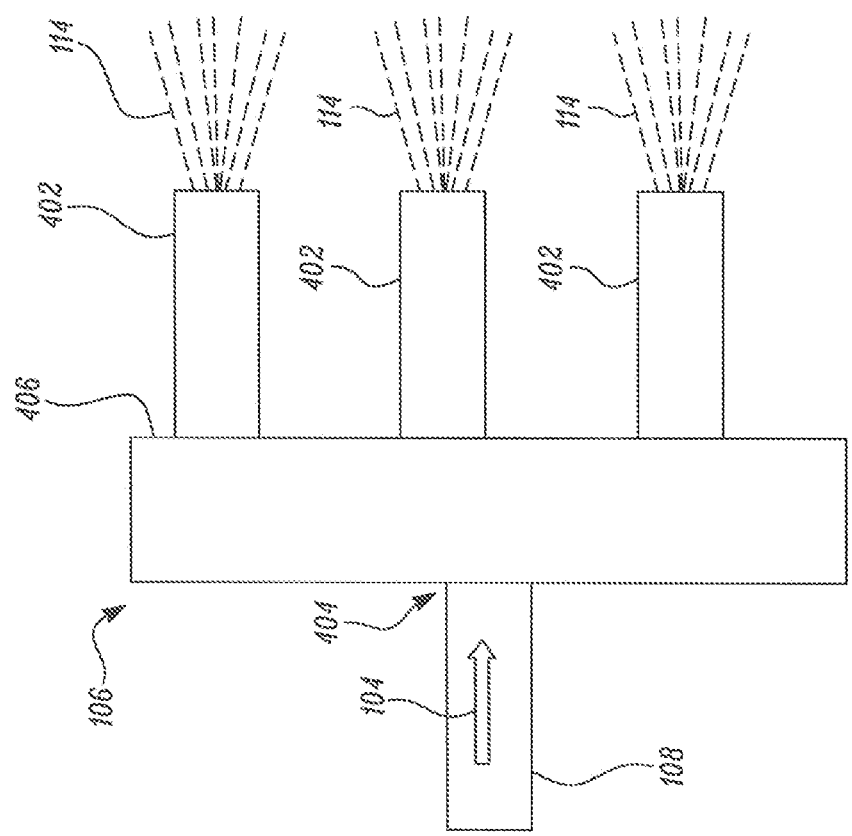
FIG. 5 schematically depicts an engine cleaning mist forming unit of the cleaning system.

In the illustrated embodiment of FIG. 4, the mist forming unit 106 is disposed at the end of the delivery device 108. In an arrangement, as shown in FIG. 5, the mist forming unit 106 is disposed at a delivery end 404 of the delivery device 108. The mist forming unit 106 may be mounted on the delivery device 108 by various methods, such as mechanical joints, fasteners, couplers, or combinations thereof. The delivery end 404 and the mist forming unit 106 may be disposed in the engine core 211. In the illustrated embodiment of FIG. 5, the mist forming unit 106 includes multiple delivery nozzles 402. In some other arrangement, the delivery device 108 may include one delivery nozzle 402. The delivery nozzles 402 are configured to receive the engine cleaning liquid 104 from the delivery device 108 and vapourise the engine cleaning liquid 104 to the engine cleaning mist 114. The delivery nozzles 402 further direct the engine cleaning mist 114 into the engine core 211. The delivery nozzles 402 may be arranged linearly or in an arc. The mist forming unit 106 may include a supply conduit 406 that receives engine cleaning liquid 104 from the delivery device 108 and distributes the engine cleaning liquid 104 to the delivery nozzles 402. In some cases, the mist forming unit 106 may be a lance disposed at the delivery end 404. The delivery nozzles 402 may be part of the lance. In an arrangement, the delivery nozzles 402 may aerosolise or atomise the engine cleaning liquid 104 before delivery into the engine core 211. In an arrangement, the mist forming unit 106 may be specific to an engine geometry. The engine geometry may correspond to a single type (e.g., model) of gas turbine engines or a family of gas turbine engines.

Referring to FIG. 4, the pump 110 is configured to draw the engine cleaning mist 114 through the engine core 211 to clean the gas paths 210 within the engine core 211. The pump 110 can be any device that generates a pressure difference in order to draw the engine cleaning mist 114 through the engine core 211. In an arrangement, the pump 110 at least one of a vacuum pump and a fan.

The mist collecting arrangement 112 further includes a tooling 118 and a conduit 120. The tooling 118 is configured to interface with the rear of the engine core 211. Specifically, the tooling 118 is configured to interface with the engine core 211 at the rear end 204. The tooling 118 may be designed to form a sealed interface with the engine core 211 in order to substantially prevent any leakage of gas and liquids across the sealed interface. The sealed interface may prevent any leakage of the engine cleaning mist 114. The sealed interface may also prevent any leakage of an external fluid (e.g., air) into the conduit 120. The tooling 118 is also in fluid communication with an interior of the engine core 211. The tooling 118 may be made of a metallic material, such as a lightweight metal or metal alloy. For example, the tooling 118 may be made of aluminium or aluminium alloy. In another embodiment, the tooling 118 may be made of composites, plastics etc. In an arrangement, the tooling 118 may be designed to interface with a specific rear engine geometry. The specific rear engine geometry may correspond to a single type (e.g., model) of gas turbine engines or a family of gas turbine engines.

The conduit 120 extends between the tooling 118 and the condensing chamber 116. Further, the conduit 120 is in fluid communication with the tooling 118 and the condensing chamber 116. The conduit 120 may include a flexible hose, a rigid pipe, or a combination thereof. The conduit 120 may be made of a fluid impermeable material to substantially prevent any leakage of the engine cleaning mist 114. The conduit 120 may further include various components, such as fluid connectors, pipe fittings, adapters etc. The conduit 120 may include one or more bends in order to deliver the engine cleaning mist 114 to the condensing chamber 116. The conduit 120 may form a sealed interface with the tooling 118 to substantially prevent any leakage of the engine cleaning mist 114.

As shown in FIG. 4, the pump 110 is disposed in the conduit 120. The pump 110 may be mounted on the conduit 120 by various methods, such as fasteners, joints, and so forth. The flowrate at which the pump 110 draws the engine cleaning mist 114 may depend on various factors. The pump 110 may generate sufficient flow (e.g., airflow) to draw the engine cleaning mist 114 through the engine core 211 but at a flowrate sufficiently low enough to allow the droplets of liquid in the engine cleaning mist 114 to dwell and soak surfaces (e.g., blade surfaces) of various components of the engine core 211. The blade surfaces can belong to the multiple compressors and the turbines of the engine core 211. This may result in adequate cleaning of the gas paths 210 of the engine core 211.

The mist collecting arrangement 112 is configured to collect the engine cleaning mist 114 that has passed through the engine core 211 and condense the collected engine cleaning mist 114 in the condensing chamber 116. The condensing chamber 116 may be defined by a vessel or a tank. As shown in FIG. 4, the condensing chamber 116 is open to atmosphere. Specifically, the condensing chamber 116 may be defined by an open-to-atmosphere tank. However, in an alternative arrangement, the condensing chamber 116 may be a closed chamber. The conduit 120 delivers the collected engine cleaning mist 114 to the condensing chamber 116. The collected engine cleaning mist 114 may condense on one or more sides of the condensing chamber 116. Condensation may lead to formation of droplets of the engine cleaning liquid 104 on the sides of the condensing chamber 116. The engine cleaning liquid 104 may flow downwards and may be collected in the condensing chamber 116. In an arrangement, the condensing chamber 116 may be cooled by a cooling mechanism, such as a heat exchanger, a double walled configuration receiving a coolant, and so forth.

In an arrangement, the cleaning system 100 may further include one or more support members (not shown) to support one or more components of the cleaning system 100, such as the delivery device 108 and the conduit 120.

During an exemplary cleaning operation, the engine cleaning liquid 104 may be pressurised and supplied to the delivery device 108. The delivery device 108 supplies the pressurised engine cleaning liquid 104 to the mist forming unit 106. The mist forming unit 106 generates the engine cleaning mist 114. The mist forming unit 106 further supplies the engine cleaning mist 114 into the engine core 211. The pump 110 draws the engine cleaning mist 114 through the engine core 211. The engine cleaning mist 114 travels through the tooling 118 and the conduit 120 into the condensing chamber 116.

In an arrangement, a control unit (not shown) may coordinate the start of mist production and airflow generation. The control unit may regulate at least the mist forming unit 106 and the pump 110. The control unit may regulate a cleaning cycle that may include single or multiple wash and rinse cycles.

Figure 6:
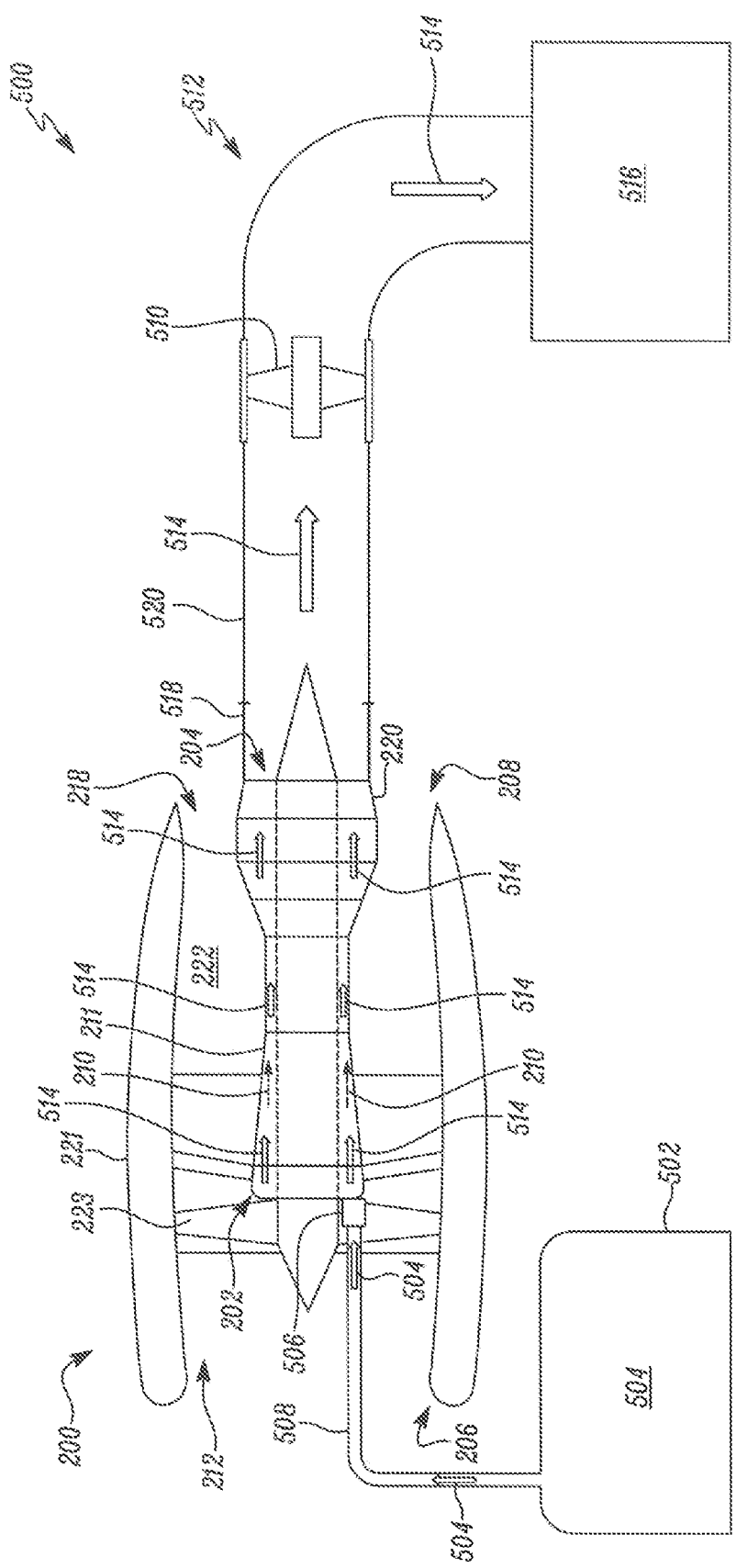
FIG. 6 schematically depicts another cleaning system for cleaning a gas turbine engine.

FIG. 6 shows a cleaning system 500 that is substantially similar to the cleaning system 100 described above. The cleaning system 500 is used to clean the gas turbine engine 200 described above. The cleaning system 500 includes a source 502 of an engine cleaning liquid 504, an engine cleaning mist forming unit 506, at least one delivery device 508, a pump 510, and a mist collecting arrangement 512 that are equivalent to the source 102 of the engine cleaning liquid 104, the engine cleaning mist forming unit 106, the at least one delivery device 108, the pump 110, and the mist collecting arrangement 112, respectively, of the cleaning system 100. The engine cleaning mist forming unit 506 is hereinafter referred to as "the mist forming unit 506". The mist collecting arrangement 512 includes a condensing chamber 516, a tooling 518 and a conduit 520 similar to the mist collecting arrangement 112.

The delivery device 508 receives the engine cleaning liquid 504 from the source 502. In an arrangement, the source 502 may provide the engine cleaning liquid 504 to the delivery device 508 in pressurised state. The delivery device 508 delivers the engine cleaning liquid 504 to the mist forming unit 506. The mist forming unit 506 vapourises the engine cleaning liquid 504 to form the engine cleaning mist 514. The mist forming unit 508 delivers the engine cleaning mist 514 into the engine core 211 of the gas turbine engine 200. The pump 510 draws the engine cleaning mist 514 through the engine core 211. The mist collecting arrangement 512 collects the engine cleaning mist from the engine core 211 and condenses the collected engine cleaning mist 514 in the condensing chamber 516.

However, as shown in FIG. 6, the at least one delivery device 508 is configured to be inserted from the front of the gas turbine engine 200. Specifically, the delivery device 508 is inserted from the front end 206 of the gas turbine engine 200. In an arrangement, the delivery device 508 may be inserted between a pair of adjacent blades of the propulsive fan 223 of the gas turbine engine 200. In a further arrangement, the delivery device 508 may also be inserted between a pair of adjacent compressor blades (not shown) of the gas turbine engine 200. The compressor blades may belong to the low pressure compressor of the gas turbine engine 200.

Further, the condensing chamber 516 of the mist collecting arrangement 512 is a closed chamber. A tank defining the condensing chamber 516 is a closed tank which is not open to atmosphere. In another embodiment, the condensing chamber 516 may be an open-to-atmosphere chamber.

Figure 7:
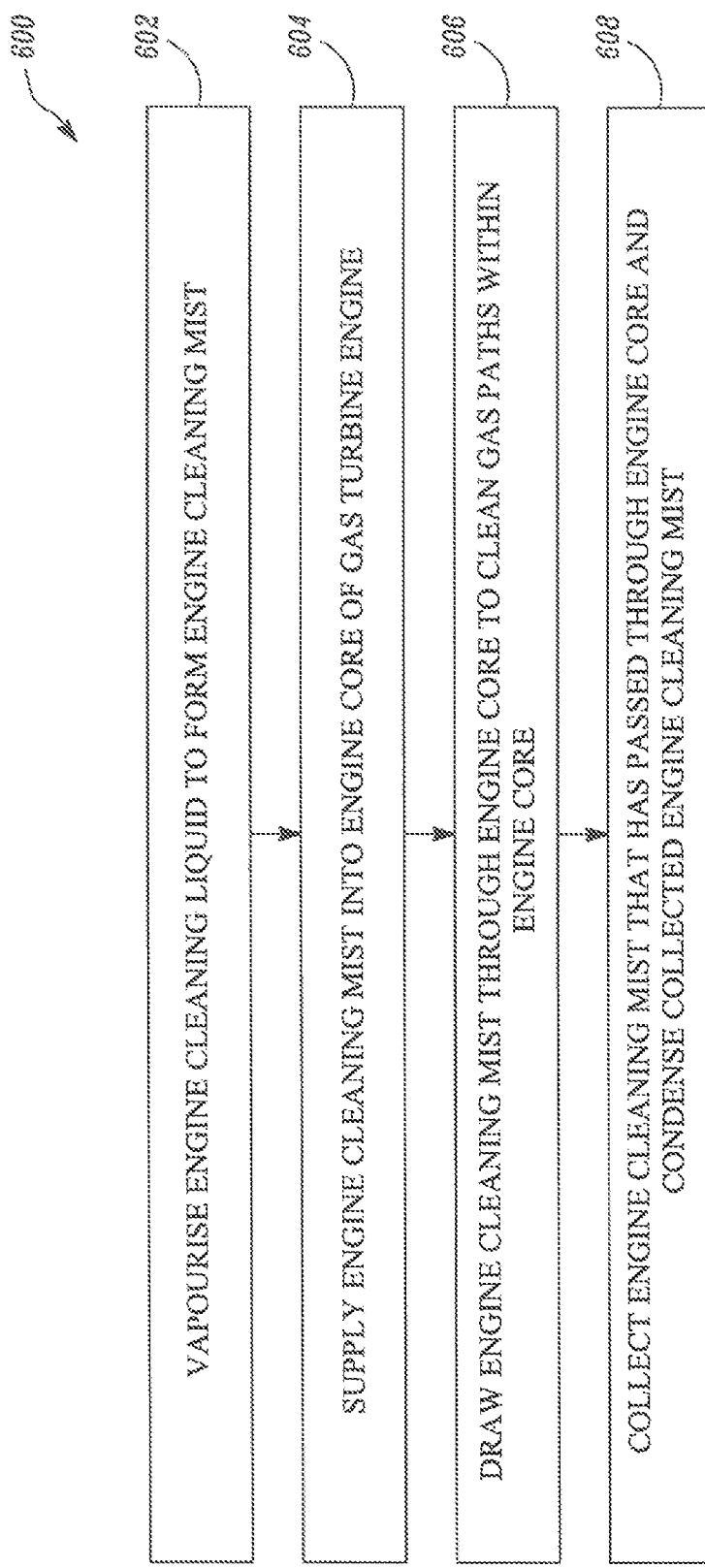
FIG. 7 depicts a flowchart of a method of cleaning a gas turbine engine.

FIG. 7 illustrates a flowchart of a method 600 of cleaning gas paths in an engine core of a gas turbine engine. The method 600 will be explained with reference to the cleaning systems 100, 500 and the gas turbine engine 200 described above.

At step 602, the method 600 includes vapourising the engine cleaning liquid 104 to form the engine cleaning mist 114.

At step 604, the method 600 includes supplying the engine cleaning mist 114 into the engine core 211 of the gas turbine engine 200.

In an arrangement, the method further includes supplying the engine cleaning liquid 104 to the mist forming unit 106. The mist forming unit 106 vapourises the engine cleaning liquid 104 to form the engine cleaning mist 114 and supplies the engine cleaning mist 114 into the engine core 211 of the gas turbine engine 200.

In an arrangement, the method 600 further includes placing the delivery device 108 in front of the engine core 211. The delivery device 108 is configured to supply the engine cleaning liquid 104 to the mist forming unit 106.

In an arrangement, placing the delivery device 108 further includes inserting the delivery device 108 from the rear of the gas turbine engine 200 through the bypass duct 222 of the gas turbine engine 200. In an alternative arrangement, placing the delivery device 508 further includes inserting the delivery device 508 from the front of the gas turbine engine 200.

At step 606, the method 600 further includes drawing the engine cleaning mist 114 through the engine core 211 to clean the gas paths 210 within the engine core 211. The pump 110 draws the engine cleaning mist 114 through the engine core 211.

At step 608, the method 600 further includes collecting the engine cleaning mist 211 that has passed through the engine core 211 and condensing the collected engine cleaning mist 114. The mist collecting arrangement 112 collects the engine cleaning mist 114 that has passed through the engine core 211 and condenses the collected engine cleaning mist 114 in the condensing chamber 116. The tooling 118 and the conduit 120 are used for delivering the collected engine cleaning mist 114 to the condensing chamber 116. In an arrangement, the method 600 further includes interfacing the tooling 118 with the rear of the engine core 211.

The cleaning systems 100, 500 and the method 600 of the present disclosure may draw a low particulate size mist through an engine core by means of a pump (e.g., the pump 110 or 510). This may negate the need to run a starter motor, thereby slowing the flowrate to provide greater blade surface to detergent soak time and improved blade cleaning. Further, the consumption of water and detergent may be significantly reduced. Any environmental impact associated with cleaning may also be reduced. In an arrangement, a biodegradable detergent may be used to create a biodegradable mist.

In an arrangement, the pump may be used in conjunction with a tooling (e.g., the tooling 118 or 518) sealed to the rear of the engine core. The pump and the sealed tooling at the rear of the engine core may also improve collection efficiency by collecting the effluent in a condensing chamber. There may be reduced contamination and less liquid left in the engine core. Drainage requirement of engine pipework may be reduced. Since compression is not used to generate flow of the cleaning mist, maintenance associated with contamination of a cabin bleed is reduced.

The cleaning systems 100, 500 and the method 600 of the present disclosure may not require a specialist technician to operate the gas turbine engine. Since the starter motor is not used, cleaning of the gas turbine engine is not impacted by a cool down period of the starter motor. This may lower operational costs and reduce process time. There may be less health and safety risks as the gas turbine engine is not operational during cleaning. Cleaning can occur in situ while the gas turbine engine is mounted on the aircraft. Cleaning may also be more robust to weather conditions.

While the cleaning system of the present disclosure is typically useful for cleaning an engine that is or has recently been in active service, it may be used to clean an engine that is not in active service, for example if the aircraft has been grounded for some reason. The cleaning system can then be usefully employed to remove dampness accumulated during the period for non-use, for example in preparation for new active service or simply periodically to help preserve the engine during an extended period of non-use. In some arrangements one or more dehumidifying units may be used in conjunction with or as part of the cleaning system of the present disclosure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of cleaning gas paths in an engine core of a gas turbine engine, the method comprising the steps of:
   vapourising an engine cleaning liquid to form an engine cleaning mist;
   supplying the engine cleaning mist into the engine core of the gas turbine engine;
   drawing the engine cleaning mist through the engine core to clean the gas paths within the engine core;
   collecting the engine cleaning mist that has passed through the engine core and condensing the collected engine cleaning mist;
   placing a delivery device in front of the engine core;
   arranging a conduit between and interconnecting a rear engine core exhaust nozzle of the engine core and a condensing chamber, the conduit being connected to the rear engine core exhaust nozzle via a tooling; and
   drawing the engine cleaning mist through the engine core via a pump to clean the gas paths within the engine core by creating a pressure difference that pulls the cleaning mist through the engine core, the pump further configured to deliver the engine cleaning mist to the condensing chamber via the conduit, the pump being arranged downstream of the rear engine core exhaust nozzle,
   wherein placing the delivery device further comprises inserting the delivery device from a rear of the gas turbine engine through a bypass duct of the gas turbine engine, and
   wherein, after the delivery device is inserted from the rear of the gas turbine engine, the delivery device extends from a bypass exhaust nozzle, through the bypass duct, and into a front end of the engine core.

2. The method according to claim 1, further comprising supplying the engine cleaning liquid to an engine cleaning mist forming unit, wherein the engine cleaning mist forming unit vapourises the engine cleaning liquid to form the engine cleaning mist and supplies the engine cleaning mist into the engine core of the gas turbine engine.

3. The method according to claim 1, wherein the delivery device includes at least one of at least one flexible hose and at least one pipe.

4. The method according to claim 3, wherein the at least one of the at least one flexible hose and the at least one pipe extend from a source of the engine cleaning liquid, through the bypass duct, and to the front end of the engine core, and wherein the source of the engine cleaning liquid is one of a tank and a vessel.

5. The method according to claim 1, wherein the engine core include a compressor having a low pressure compressor and high pressure compressor located axially aft of the low pressure compressor, a combustor located axially aft of the high pressure compressor, a turbine located axially aft of the combustor and having a high pressure turbine and a low pressure turbine located axially aft of the high pressure turbine, and the rear engine core exhaust nozzle located axially aft of the low pressure turbine, and wherein the front end of the engine core is located proximal the low pressure compressor.

6. The method according to claim 1, wherein the tooling is a seal that provides a sealing interface between the conduit and the rear engine core exhaust nozzle.

7. The method according to claim 1, wherein the pump generates a flow of the cleaning mist through the engine core such that the cleaning mist is drawn through the engine core and droplets of cleaning mist remain in the engine core.

8. The method according to claim 1, wherein the pump is at least one of a vacuum pump and a fan.

9. The method according to claim 1, wherein the pump is arranged in the conduit directly downstream of the rear engine core exhaust nozzle.

10. The method according to claim 2, further comprising placing a portion of the delivery device in front of the engine core, wherein the delivery device is configured to supply the engine cleaning liquid to the engine cleaning mist forming unit.

* * * * *